3,703,365
FRUIT ABSCISING METHOD

Shogo Takahashi, Takayasu Yamada, and Hiromi Okudaira, Tokyo, Japan, assignors to Sankyo Company Limited, Tokyo, Japan
No Drawing. Filed Feb. 13, 1970, Ser. No. 11,356
Claims priority, application Japan, Feb. 22, 1969, 44/13,496
Int. Cl. A01n 9/36
U.S. Cl. 71—86                3 Claims

ABSTRACT OF THE DISCLOSURE

Fruit abscising composition for facilitating the harvest of fruit which comprises as an active ingredient a compound having the formula $$(RO)_3P=X \qquad (I)$$

wherein R is hydrogen atom; an alkyl group having 1 to 4 carbon atoms, e.g. methyl, ethyl, propyl, butyl; a haloalkyl group having 1 to 4 carbon atoms in the alkyl moiety, e.g. 2-chloroethyl, 2-bromoethyl, 3-chloroethyl; an alkenyl group having 2 to 4 carbon atoms, e.g. vinyl, allyl; phenyl group or benzyl group provided that at least one of the R's is the above-defined group other than hydrogen atom; and X is oxygen atom or sulfur atom and the salt thereof, e.g. an alkali metal, alkaline earth metal, copper, zinc, ammonium or organic amine salt.

The method for facilitating the harvest of fruit by accelerated abscission layer formation which comprises applying to fruited trees, an effective amount to accelerate fruit abscission of said compound (I) or the salt thereof.

---

This invention relates to a new use of certain phosphate derivatives as a fruit abscising agent.

More particularly, it relates to a fruit abscising composition for facilitating the harvest of fruit which comprises as an active ingredient a phosphate having the formula $$(RO)_3P=X \qquad (I)$$

wherein R is hydrogen atom, an alkyl group having 1 to 4 carbon atoms, a haloalkyl group having 1 to 4 carbon atoms in the alkyl moiety, an alkenyl group having 2 to 4 carbon atoms, phenyl group or benzyl group provided that at least one of the R's is the above-defined group other than hydrogen atom; and X is oxygen atom or sulfur atom or the salt thereof and an agriculturally acceptable carrier.

In the above Formula I, the group R may be illustrated by methyl, ethyl, n-propyl, isopropyl, n-butyl, isobutyl, tert.-butyl, 2-chlorothyl, 2-bromoethyl, 3-chloropropyl, 2,3-dichloropropyl, 4-chlorobutyl, vinyl, allyl, phenyl, benzyl and the like.

The above-mentioned salt of the active compound (I) may illustratively include, for example, the alkali metal salt, e.g. sodium or potassium salt; the alkaline earth metal salt, e.g. calcium or magnesium salt; the ammonium salt; the metal salt, e.g. zinc or copper salt; the organic amine salt, e.g. dimethylamine or diethylamine salt; and the like.

Also, it relates to a new method for facilitating the harvest of fruit by accelerated abscission layer formation which comprises applying to fruited trees an effective amount to accelerate fruit abscission of the compound having the above Formula I or the salt thereof.

Heretofore, various fruits, for example, orange, lemon, olive, plum, chestnut, grape and the like have been principally harvested by hand with a great number of farm labours and it has been a long-pending problem in the art to effectively save the labour for gathering of ripe fruits. Some previous attempts have been made to achieve such purpose. For instance, mechanical vibration was applied to fruited trees in branches, main branches and/or twigs thereof by means of a specific vibrator, thereby to cause the fruits fallen off. However, such prior method was not satisfactory since the harvested fruits and the vibrated branches and leaves of the tree were sometimes seriously damaged through forced mechanical power.

On the other hand, although another attempt was made wherein a chemical agent was applied to fruited trees, favourable result was not obtained because of simultaneous occurrence of the fall of leaves and adverse effect on the harvested fruits during storage.

As a result of our extensive studies to develop a new and effective fruit abscising agent, it has been unexpectedly found that the phosphate of the above Formula I and the salt thereof exert a superior biological effect to accelerate the formation of an abscission layer between the stem and the fruit adherent thereto in a fruit tree, which leads to the facilitation of the falling of the fruit to be harvested, without the prior art disadvantages, and the present invention is based upon the discovery set forth just hereinabove.

It is, accordingly, an object of this invention to provide a new and unique fruit abscising composition which comprises as an active ingredient the phosphate of the above Formula I or the salt thereof and an agriculturally acceptable carrier.

It is another object of this invention to provide a new and valuable method for the facilitation of the harvest of fruit which comprises applying to fruited trees an effective amount of the phosphate of the above Formula I or the salt thereof.

These and other objects of this invention will become apparent from the following detailed description.

The active ingredients of this invention, i.e. the phosphate of the above Formula I and the salt thereof themselves are all known in the art and they can be easily prepared according to any of the conventional procedures known per se.

Illustrative examples of the active ingredient of this invention include the following:

dimethyl hydrogen phosphate;
ethyl hydrogen phosphate;
isopropyl hydrogen phosphate;
diisopropyl hydrogen phosphate;
di-n-propyl hydrogen phosphate;
di-n-butyl hydrogen phosphate;
tri-n-butyl hydrogen phosphate;
di-2-chloroethyl hydrogen phosphate;
tri-2-chloroethyl phosphate;
diallyl hydrogen phosphate;
diphenyl hydrogen phosphate;
triphenyl phosphate;
dibenzyl hydrogen phosphate;
a mixture of isopropyl hydrogen phosphate with diisopropyl hydrogen phosphate in equal portions;
sodium isopropyl phosphate;
potassium isopropyl phosphate;
ammonium isopropyl phosphate;
sodium diisopropyl phosphate;
potassium diisopropyl phosphate;
ammonium diisopropyl phosphate;
calcium diisopropyl phosphate;
sodium di-n-butyl phosphate;
copper diisopropyl phosphate;
zinc diisopropyl phosphate;
dimethylamine diisopropyl phosphate;

isopropyl hydrogen thiophsphate;
diisopropyl hydrogen thiophosphate;
di-n-butyl hydrogen thiophosphate;
tri-n-butyl thiophosphate;
di-2-chloroethyl hydrogen thiophosphate;
triphenyl thiophosphate;
dibenzyl hydrogen thiophosphate;
sodium diisopropyl thiophosphate; and
calcium diisopropyl thiophosphate.

In manufacturing said fruit abscising composition, the active compound (I) or the salt thereof used according to this invention may be conveniently formulated by a known procedure and employed in various forms including liquids, dusts, and wettable powders etc.

Liquids may be prepared by dissolving the active compound in an agriculturally-acceptable liquid carrier, i.e. a suitable solvent with or without one or more of known adjuvants commonly employed in the art such as emulsifying agents, wetting agents, or dispersing agents. Suitable solvents include water, alcohols such as methanol or ethanol, acetone, benzene, toluene, xylenes, solvent naphtha, petroleum ether, the mixture thereof and the like. Suitable adjuvants may be any of those which is ordinarily employed in the art, and include, for example, the condensation products of alkylene oxides with phenols or organic acids, alkylarylsulfonates, dialkyl sulfosuccinate, polyoxyethylene ether or ester derivatives of alcohols or acids and the like.

Dusts may be prepared by mixing said active compound in and on an inert agriculturally-acceptable solid carrier by a conventional procedure. Suitable solid carriers for use in this invention include, for example, talc, pyrophylite, kieselguhr, clay, bentonite, diatomaceous earth, kaolin, precipitated chalk and the like.

Wettable powders may be prepared by mixing said active compound or the metal complex thereof with one or more of the aforementioned solid carriers and suitable dispersing agents. Suitable dispersing agents include, for example, those aforementioned adjuvants such as alkylbenzenesulfonates, lignosulfonates or polyoxyalkylene glycol ethers or esters.

The concentration of the active compound or the salt thereof in the composition of this invention may normally be from about 0.5 to about 98% by weight, and preferably from about 1.0 to about 70% by weight, based upon the total weight of the composition, although the amount of the active ingredient employed will largely depend upon such factors as the kind of fruit tree, the form of a composition of the specific active ingredient, the ripening degree of fruit and the like. It should be, however, understood that the amount of an active compound or the salt thereof employed is not a critical feature of this invention. Two or more of said active ingredients may be advantageously incorporated into the composition of this invention.

It should be avoided that other known agricultural chemicals, for example, insecticide, fungicide, acaricide and the like be incorporated into the present invention because of the possibility of residual toxicity which would appear in the harvested fruits.

The method for facilitating the harvest of fruit of this invention comprises applying to fruited trees by uniformly spraying them on both sides of their leaves, branches, fruits and the like an effective amount of the active compound (I) or the salt thereof to exert the desired effect of forming an abscission layer, usually before a few days to about 2 weeks of a possible harvest time. Then, suitable, preferably constant, vibration is usually applied to the trees, for example, in the branches, main branches and/ or stems thereof by means of a mechanical vibrator commonly employed in the art, thereby to cause the fruits to fall off.

The method of this invention may be conveniently applied to any fruit trees, especially mandarin orange tree (Citrus unshiu), orange tree (Citrus natsudaidai), Hassaku tree (Citrus hassaku), naval orange tree and Valencia orange tree (Citrus sinensis), lemon tree (Citrus limon), olive tree (Olea europeaea), cherry tree (Prunus avium), cherry plum tree (Prunus cerasifera), apricot tree (Prunus armeniaca), plum tree (Prunus mume), palm tree (Phoenix dactylifera), a grape tree (Vitis vinifera), walnut tree (Juglans mandshurica); and and the like.

In order to demonstrate the superior fruit abscission effect of this invention and some specific embodiments of this invention, some examples are given hereinbelow.

EXAMPLE 1

Three groups of mandarin orange trees (Citrus unshiu) of 7 years old were treated by uniformly spraying thereto a sufficient amount of one of the active compounds indicated below in the form of a 5% aqueous solution or emulsion.

After 10 days of the treatment, constant vibration was applied to the tree in its branches by means of a conventional vibrator.

The numbers of falling fruits and of falling leaves in each group were measured, respectively, and the average falling rate of fruits and the average number of falling leaves were calculated.

The results are given in the following Table 1.

TABLE 1

| Active compound | Falling rate of fruits (percent) | Number of falling leaves | Fruit oil exuding* |
|---|---|---|---|
| 1___ Dimethyl hydrogen phosphate____ | 93.6 | 299 | ± |
| 2___ Ethyl hydrogen phosphate_____ | 51.6 | 320 | ± |
| 3___ Isopropyl hydrogen phosphate____ | 90.0 | 243 | ± |
| 4___ Diisopropyl hydrogen phosphate__ | 95.0 | 352 | ± |
| 5___ Di-n-propyl hydrogen phosphate__ | 48.0 | 420 | — |
| 6___ Di-n-butyl hydrogen phosphate___ | 96.3 | 370 | ± |
| 7___ Tri-n-butyl phosphate_____ | 75.3 | 305 | ± |
| 8___ Di-2-chloroethyl hydrogen phosphate. | 67.0 | 423 | + |
| 9___ Tri-2-chloroethyl phosphate_____ | 78.3 | 154 | + |
| 10__ Diallyl hydrogen phosphate_____ | 52.0 | 434 | ± |
| 11__ Diphenyl hydrogen phosphate____ | 43.0 | 320 | — |
| 12__ Triphenyl phosphate_____ | 87.6 | 267 | ± |
| 13__ Dibenzyl hydrogen phosphate____ | 33.0 | 276 | — |
| 14__ A mixture of isopropyl hydrogen phosphate and diisopropyl hydrogen phosphate in equal portions. | 92.3 | 301 | ± |
| 15__ Sodium diisopropyl phosphate____ | 96.0 | 240 | — |
| 16__ Potassium diisopropyl phosphate_ | 95.6 | 231 | — |
| 17__ Calcium diisopropyl phosphate___ | 93.3 | 222 | — |
| 18__ Sodium di-n-butyl phosphate_____ | 92.0 | 213 | — |
| 19__ Zinc diisopropyl phosphate_____ | 90.0 | 220 | — |
| 20__ Dimethylamine diisopropyl phosphate. | 91.0 | 232 | — |
| H₂O (control)_____ | 11.6 | 218 | — |

*The sign (+) means a large amount of fruit oil exuding; the sign (±) means only a minor amount of fruit oil exuding; the sign (—) means no fruit oil exuding.

It will become apparent from the above results that the active compounds of this invention exhibit a high falling rate of mandarin orange fruits as compared with that of the control.

EXAMPLE 2

Well-fruited mandarin orange trees (Citrus unshiu: variety, Sugiyama) of 9 years old were treated with the active ingredient indicated below in the form of a 5% aqueous solution by uniformly spraying thereto until a whole crown of the tree was wetted by means of a conventional sprayer.

After 15 days of the treatment, constant vibration was applied to the tree in its branches by means of a conventional vibrator.

The fruits which fell off were investigated and then the number of the fruits bearing a complete abscission layer and that of the damaged fruits bearing an incomplete abscission layer were counted, respectively. The number of the remaining fruits and the average number of the falling leaves were also investigated.

The results are given in the following Table 2.

TABLE 2

| Active ingredient | Falling rate of fruits (percent) | | Average number of falling leaves | Phytotoxic spot on the surface of fruit |
|---|---|---|---|---|
| | Fruit bearing a complete abscission layer | Fruit bearing an incomplete abscission layer | | |
| A mixture of potassium isopropyl phosphate and potassium diisopropyl phosphate in equal portions | 83.6 | 11.3 | 102 | — |
| A mixture of ammonium isopropyl phosphate and ammonium diisopropyl phosphate in equal portions | 86.9 | 3.8 | 87 | — |
| H₂O (control) | 37.0 | 33.9 | 68 | — |

It will become apparent from the above results that the active compounds of this invention exhibit a high falling rate of mandarin orange fruits as compared with that of the control.

EXAMPLE 3

Three groups of plum trees (*Prunus mume*: variety, Beniyoro) bearing a great number of fruits were treated with the active ingredient indicated below in the form of an 1.0% aqueous solution or emulsion by uniformly spraying over a whole crown of the tree to such an extent that some of the liquid sprayed onto the leaves dripped therefrom.

The above-mentioned treatment was made before 10 days of the time when plum fruits will be harvested for the production of plum liqueur.

After 10 days of the treatment, constant vibration was applied to the tree in its main branches by means of a conventional vibrator.

The numbers of falling fruits and of falling leaves as well as remaining leaves were investigated, respectively.

The results are given in the following Table 3.

TABLE 3

| Active ingredient | Falling rate of fruits (percent) | Falling leaves* | Phytotoxic spot** on the surface of fruit |
|---|---|---|---|
| Potassium diisopropyl phosphate | 96.1 | — | — |
| Ammonium diisopropyl phosphate | 99.2 | — | — |
| Dimethyl hydrogen phosphate | 89.6 | ± | ± |
| Di-n-butyl hydrogen phosphate | 79.3 | + | + |
| Tri-dichloropropyl phosphate | 83.7 | ± | — |
| Ammonium diisopropyl thiophosphate | 92.3 | ± | — |
| Sodium di-n-butyl thiophosphate | 79.3 | ± | — |
| H₂O (control) | 49.1 | — | — |

*The sign (+) means several phytotoxic spots on the surface of leaf; the sign (±) means a few vague spots on the surface of leaf; the sign (—) means no spots on the surface of leaf.
**The sign (+) means falling of some leaves; the sign (±) means falling of only a few leaves; the sign (—) means no falling of leaves.

It will become apparent from the above results that the active compounds of this invention exhibit a high falling rate of fruits in plum tree as compared with that of the control.

EXAMPLE 4

Vines (*Vitis vinifera*: variety, Campbell Early) of 4 years old were treated with the active ingredient indicated below in the form of an 2% aqueous solution or emulsion by uniformly spraying thereto to such an extent that the surface of leaf was completely wetted. The above-mentioned treatment was made before 14 days of a harvest time.

After 14 days of the treatment, several grape bunches were taken from every tree and constantly vibrated.

The number of falling grains was investigated and the number of grains bearing a complete abscission layer and of grains bearing an incomplete abscission layer were investigated, respectively.

The results are given in the following Table 4.

TABLE 4

| | Active ingredient | Falling rate of fruits (percent) | | Phytotoxic* spot on the surface of fruit | Phytotoxicity** |
|---|---|---|---|---|---|
| | | Fruit bearing a complete abscission layer | Fruit bearing an incomplete abscission layer | | |
| 1 | Sodium isopropyl phosphate | 48.4 | 18.6 | | ± |
| 2 | A mixture of potassium isopropyl phosphate and potassium diisopropyl phosphate in equal portions | 73.2 | 10.4 | — | ± |
| 3 | Calcium diisopropyl phosphate | 69.8 | 15.0 | — | ± |
| 4 | A mixture of ammonium isopropyl phosphate and ammonium diisopropyl phosphate in equal portions | 88.8 | 8.1 | — | ± |
| 5 | Diphenyl hydrogen phosphate | 40.5 | 15.3 | ± | + |
| 6 | Trimethyl phosphate | 46.2 | 19.0 | — | — |
| 7 | Triethyl phosphate | 36.0 | 39.5 | ± | + |
| 8 | Dimethyl hydrogen phosphate | 65.1 | 17.8 | ± | + |
| 9 | Triphenyl phosphate | 60.8 | 27.6 | + | ± |
| 10 | Tri-n-butyl phosphate | 21.9 | 12.5 | ++ | ++ |
| 11 | Dimethyl hydrogen phosphate | 77.8 | 20.3 | — | ± |
| 12 | Di-n-butyl hydrogen phosphate | 56.7 | 16.0 | + | ++ |
| 13 | Ammonium diisopropyl thiophosphate | 63.0 | 11.8 | — | ± |
| 14 | Isopropyl hydrogen thiophosphate | 44.5 | 14.2 | — | ± |
| 15 | Triphenyl thiophosphate | 52.5 | 17.4 | ± | ± |
| | H₂O (control) | 2.1 | 13.8 | — | — |

*The sign (—) means no discoloration and phytotoxic spot on the surface of fruit; the sign (±) means only a little discoloration on the surface of fruit; the sign (+) means several phytotoxic spots on the surface of fruit; the sign (++) means several uneven phytotoxic spots on the surface of fruit.
**The sign (±) means a few phytotoxic spots on the surface of leaf; the sign (+) means brown discoloration among leaf veins and around leaf edge; the sign (++) means enlarged brown-colored area on the surface of leaf.

It will become apparent from the above results that the active compounds of this invention exhibit a high falling rate of grapes as compared with that of the control.

EXAMPLE 5

Chestnut trees (*Castanea crenata*: variety, Tsukuba) were treated with the active ingredient indicated below in the form of a 3% aqueous solution by uniformly spraying thereto until a whole crown of the tree was completely wetted.

The above-mentioned treatment was made at the time when about 30% of the whole fruits grew to the harvest.

After 8 days of the treatment, constant vibration was applied to the tree in its branches by a conventional vibrator.

The number of falling fruits and of remaining fruits were investigated, respectively.

The results are given in the following Table 5.

TABLE 5

| Active compound | Falling rate of fruits* (percent) | Spot on the surface of leaves |
|---|---|---|
| Potassium diisopropyl phosphate | 65.3 | — |
| A mixture of ammonium isopropyl phosphate and ammonium diisopropyl phosphate in equal portions | 78.2 | — |
| H₂O (control) | 36.3 | — |

*The number of those fruits contained in a chestnut bur was omitted from the investigated number.

It will become apparent from the above results that the active compounds of this invention exhibit a high falling rate of chestnut fruits as compared with that of the control.

EXAMPLE 6

Three groups of well-fruited mandarin orange trees (*Citrus Unshiu*) of 7 years old were treated with the active compound indicated below in the form of a 5% aqueous solution or emulsion by uniformly spraying over a whole crown of the tree.

After 7 days of the treatment, constant vibration was applied to the tree in its branches.

The numbers of falling fruits and of falling leaves were investigated.

The results are given in the following Table 6.

TABLE 6

| Active compound | Falling rate of fruits (percent) | Damage on the surface of fruit* | Number of falling leaves |
|---|---|---|---|
| Isopropyl hydrogen thiophosphate | 87.0 | ± | 252 |
| Diisopropyl hydrogen thiophosphate | 91.3 | ± | 295 |
| Di-n-butyl hydrogen thiophosphate | 91.6 | ± | 221 |
| Tri-n-butyl thiophosphate | 85.0 | ± | 247 |
| Di-2-chloroethyl hydrogen thiophosphate | 70.3 | ± | 280 |
| Triphenyl thiophosphate | 68.6 | ± | 302 |
| Dibenzyl hydrogen thiophosphate | 65.0 | ± | 266 |
| Sodium diisopropyl thiophosphate | 88.6 | — | 224 |
| Calcium diisopropyl thiophosphate | 84.6 | — | 183 |
| H₂O (control) | 9.3 | ± | 237 |

*The sign (+) means a large amount of fruit oil exuding; the sign (±) means only a minor amount of fruit oil exuding; the sign (—) means no fruit oil exuding.

What is claimed is:

1. A method for facilitating the harvest of fruit by accelerated abscission layer formation which comprises applying to fruited trees an effective amount to accelerate fruit abscission of a compound having the formula $$(RO)_3P=X \qquad (I)$$

wherein R is hydrogen atom, an alkyl group having 1 to 4 carbon atoms, a haloalkyl group having 1 to 4 carbon atoms in the alkyl moiety, an alkenyl group having 2 to 4 carbon atoms, phenyl group or benzyl group provided that at least one of the R's is the above-defined group other than hydrogen atom; and X is oxygen atom or sulfur atom or the salt thereof.

2. The method according to claim 1 wherein said salt is an alkali metal, alkaline earth metal, copper, zinc, ammonium or organic amine salt.

3. The method according to claim 1 wherein said active ingredient is selected from the group consisting of isopropyl hydrogen phosphate,
ammonium isopropyl phosphate,
potassium isopropyl phosphate,
sodium isopropyl phosphate,
diisopropyl hydrogen phosphate,
ammonium diisopropyl phosphate,
potassium diisopropyl phosphate,
sodium diisopropyl phosphate,
dimethyl hydrogen phosphate,
di-n-butyl hydrogen phosphate, and
triphenyl phosphate.

References Cited

FOREIGN PATENTS 666,372  7/1963  Canada  71—71

JAMES O. THOMAS, JR., Primary Examiner

U.S. Cl. X.R.

71—71, 72, 87